United States Patent
Schneider

(10) Patent No.: US 10,753,451 B2
(45) Date of Patent: Aug. 25, 2020

(54) HOLLOW GEAR WITH INNER TOOTHING AND CROWN TOOTHING, AS WELL AS METHOD FOR THE PRODUCTION THEREOF AND TRANSMISSION HAVING A HOLLOW GEAR OF THIS TYPE

(71) Applicant: ZF Friedrichshafen AG, Friedrichshafen (DE)

(72) Inventor: Benjamin Schneider, Emmendingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 106 days.

(21) Appl. No.: 15/767,858

(22) PCT Filed: Sep. 15, 2016

(86) PCT No.: PCT/EP2016/071836
§ 371 (c)(1),
(2) Date: Apr. 12, 2018

(87) PCT Pub. No.: WO2017/063813
PCT Pub. Date: Apr. 20, 2017

(65) Prior Publication Data
US 2018/0306301 A1 Oct. 25, 2018

(30) Foreign Application Priority Data
Oct. 13, 2015 (DE) .......... 10 2015 219 855

(51) Int. Cl.
*F16H 55/17* (2006.01)
*F16H 57/08* (2006.01)

(52) U.S. Cl.
CPC ............. *F16H 55/17* (2013.01); *F16H 57/08* (2013.01); *F16H 2055/173* (2013.01); *F16H 2055/176* (2013.01)

(58) Field of Classification Search
CPC . F16H 1/28; F16H 55/02; F16H 55/17; F16H 2055/173; F16H 2055/176; F16H 57/08
See application file for complete search history.

(56) References Cited

U.S. PATENT DOCUMENTS

| 2,392,803 A | * | 1/1946 | Austin | ..................... | B23F 19/06 |
|  |  |  |  |  | 409/33 |
| 3,083,583 A | * | 4/1963 | Reinhold | ............... | B29D 29/08 |
|  |  |  |  |  | 474/153 |

(Continued)

FOREIGN PATENT DOCUMENTS

| CN | 104235312 A | 12/2014 |
| DE | 19961988 A1 | 7/2001 |

(Continued)

OTHER PUBLICATIONS

Internationl Search Report (English Translation) PCT/EP2016/071836, dated Nov. 17, 2016. (3 pages).

*Primary Examiner* — David R Morris
(74) *Attorney, Agent, or Firm* — Dority & Manning, P.A.

(57) ABSTRACT

A ring gear (100) for a planetary transmission includes a gear ring (110) formed with an internal gearing (120) on an inner circumferential surface of the gear ring (110). The gear ring (110) also includes a radially projecting and unilaterally axially overhung flange (130) on an outer circumferential surface of the gear ring (110). The flange (130) is formed with a circumferential collar (131) and a collar overhang (132). The collar overhang (132) has a crown gearing (140). The crown gearing (140) is continuous and axially extends through the collar (131).

10 Claims, 2 Drawing Sheets

(56) References Cited

U.S. PATENT DOCUMENTS

| | | | | |
|---|---|---|---|---|
| 4,744,263 A | * | 5/1988 | Kuiken | F16H 1/12 |
| | | | | 74/457 |
| 6,729,199 B2 | * | 5/2004 | Haupt | F16D 1/068 |
| | | | | 192/17 A |
| 8,251,862 B2 | * | 8/2012 | Burgman | F16H 57/0479 |
| | | | | 475/348 |
| 8,262,534 B2 | | 9/2012 | Haupt et al. | |
| 9,303,728 B2 | * | 4/2016 | Kume | H02K 5/04 |
| 10,408,325 B2 | * | 9/2019 | McKinzie | F16H 55/17 |
| 2002/0189387 A1 | | 12/2002 | Haupt et al. | |
| 2006/0035746 A1 | | 2/2006 | Griggs et al. | |
| 2009/0062058 A1 | | 3/2009 | Kimes et al. | |
| 2010/0004085 A1 | * | 1/2010 | Haupt | F16H 57/08 |
| | | | | 475/159 |
| 2010/0151986 A1 | | 6/2010 | Burgman et al. | |
| 2011/0045945 A1 | * | 2/2011 | Buechner | F16D 13/683 |
| | | | | 475/331 |
| 2013/0217531 A1 | | 8/2013 | Kume et al. | |
| 2017/0059030 A1 | * | 3/2017 | McKinzie | F16H 55/17 |

FOREIGN PATENT DOCUMENTS

| | | |
|---|---|---|
| DE | 10230861 A1 | 1/2004 |
| DE | 2452381 A | 3/2009 |
| DE | 102008040123 A1 | 1/2010 |
| EP | 0851149 A1 | 7/1998 |

* cited by examiner

HOLLOW GEAR WITH INNER TOOTHING AND CROWN TOOTHING, AS WELL AS METHOD FOR THE PRODUCTION THEREOF AND TRANSMISSION HAVING A HOLLOW GEAR OF THIS TYPE

FIELD OF THE INVENTION

The invention relates generally to a ring gear for a planetary transmission, which includes an internal gearing and a crown gearing. The invention further relates generally to a manufacturing process for such a ring gear and to a transmission including such a ring gear.

BACKGROUND

DE 199 61 988 A1 describes an arrangement for torque transmission between a ring gear and a driving part, wherein disposed in the ring gear, on the side facing the driving part, is a crown gearing which is inserted into the teeth of the driving part in the axial direction (see FIG. 2). Furthermore, yet another arrangement for torque transmission is described, according to which disposed in the driving part is a crown gearing, into which a crown gearing engages, which is located on a flange projecting over the ring gear (see FIG. 3).

With respect to the prior art, reference is further made to DE 102 30 861 A1, in particular to the design options of a plug-in connection between a ring gear and a ring gear carrier shown in FIGS. 1, 6, 7 and 8 and 10. A common feature of these design options is that the ring gear comprises a circumferential, radial protruding flange on its outer circumferential surface, which axially protrudes on a front side of the ring gear, wherein the axial overhang is formed with a crown gearing.

SUMMARY OF THE INVENTION

Example aspects of the invention provide an improved ring gear of the relevant type, in which at least one disadvantage associated with the prior art has been eliminated or has been at least greatly reduced.

In alternative example aspects, the invention also relates to a method for manufacturing a ring gear and to a transmission for a motor vehicle or a commercial vehicle, in particular an automatic transmission which includes at least one ring gear according to the invention and/or manufactured according to the invention.

The ring gear according to the invention (planetary transmission ring gear) includes a gear ring which is formed with an internal gearing on its inner circumferential surface and includes, on its outer circumferential surface, a radially projecting and unilaterally (i.e., on one front side of the ring gear or gear ring) axially overhung flange. A circumferential collar and a collar-like overhang are formed by way of the flange, and the collar-like overhang is provided with a crown gearing. The invention provides that the crown gearing is of continuous design and also axially extends through the collar. This means, the crown gearing is formed not only in the collar-like overhang, but also extends into the collar in such a way that the crown gearing is of continuous design and axially extends through the flange.

A gear ring is understood to mean, in particular, a ring-like and preferably solidly designed body which includes an inner circumferential surface, an outer circumferential surface, and two faces or face ends which connect the inner circumferential surface and the outer circumferential surface to each other in an essentially radial extension. The internal gearing formed on the inner circumferential surface is a running gearing which is provided for the direct engagement of planetary gears. The crown gearing is a spline which is provided for the twist-free connection to a ring gear carrier or the like. The ring gear or its gear ring has an axis of symmetry or rotation, by which an axial direction and a radial direction perpendicular thereto can be defined.

The crown gear is not only formed on the ring gear according to the invention in the flange section projecting over the face end, the crown gear also extends axially or in an axial direction through the entire flange. This yields several advantages. On the one hand, a considerable weight reduction or rotating-mass reduction can be achieved without changing the constructional dimensions. On the other hand, new configuration options result for the crown gearing, whereby a greater load capacity, simpler assembly, and/or simpler manufacturing can be achieved.

Preferably, the tooth gaps of the crown gearing are formed having a constant or uniform gap width in the axial direction. This means, the width of the tooth gaps or grooves (see below) formed between adjacent tooth flanks or groove flanks (see below) and an associated opening angle between these tooth flanks (i.e., the mutually facing tooth flanks of adjacent teeth) do not change across the axial course of the crown gearing.

The gearing extending through the flange is, strictly speaking, a spline, wherein only its gearing section formed in the axial overhang of the flange is a crown gearing in the conventional sense. Preferably, the tooth gaps of the spline or the crown gearing are designed to be radially continuous only in this gearing section, and therefore the tooth gaps can be penetrated by the mating gearing on the ring gear carrier in a known way.

The gearing section of the crown or spline formed in the collar of the flange preferably includes groove-like tooth gaps, each of which is formed with a groove base and, therefore, is not continuous in the radial direction. Preferably, the tooth gaps formed in a groove-like manner in the collar each include two groove flanks, which are spaced from each other in the circumferential direction, and one groove base which, in particular, is curved in the circumferential direction. Preferably, the groove flanks are designed to be essentially straight or flat and can have an angle of inclination between 0° and 25° with reference to the radial direction. Preferably, all tooth gaps or all grooves of the crown gearing are identically designed, wherein a non-identical design is also possible, whereby, for example, a mounting position can be predefined.

In the groove-like tooth gaps, undercut-like transitions can be formed between the groove flanks and the groove bases. Due to these undercut-like transitions, which are preferably formed across the entire axial length of the grooves, stress peaks induced by the notch effect are reduced. In addition, the mating gearing on the ring gear carrier to be attached can be designed to be sharp-edged, which has an advantageous effect both on its manufacturing complexity and costs and on the complexity of assembly. The undercut-like transitions are preferably produced during the machining manufacture of the crown gearing or are co-generated therewith and can be used as the runout zone for the tool or tools during the manufacture and/or can allow for a chip discharge, and therefore, in particular, manufacturing methods can also be utilized for producing the crown gearing that have not been previously employed.

The ring gear according to the invention is preferably manufactured as a single piece, i.e., in one piece or from one workpiece. Preferably, the ring gear is formed of a metal material and, in particular, of a steel material. Preferably, at least the crown or spline is manufactured by machining.

One preferred method for manufacturing a ring gear according to the invention, according to the preceding explanations, includes at least the following steps which can be carried out in an automated manner, in particular:

making an annular raw piece available, which is already formed with a flange;

producing the internal gearing by inside broaching, if necessary also helical broaching, or the like; and producing the crown or spline on the flange by pot broaching.

The internal gearing and the crown gearing can also be produced in the reverse order. The flange section overhung in a collar-like manner can be manufactured before the spline is produced, in particular by the forming and/or machining preparation of the raw piece (as part of a pre-fabrication), or also first after the production of the spline, for example by boring (wherein the tooth gaps of the already produced plug-in or crown gearing is made radially continuous).

The raw piece is, for example, a solid forged or turned part which was produced in a prior manufacturing process. The internal or running gearing is manufactured, according to the method, in the conventional way. The crown or spline is manufactured, according to the method, by pot broaching, which is an innovation, since crown gearings on ring gears of the relevant type have been previously produced by milling or the like and, in particular, by so-called fly turning. Therefore, an alternative manufacturing process for ring gears of the relevant type is also made available by way of the invention.

As mentioned above, the configuration, according to the invention, of a continuous crown gearing, in particular the groove-like design of tooth gaps which are continuous or extend axially through the flange, facilitates a simplified production of the crown gearing and, therefore, a simplified manufacturing of the ring gear, which is accomplished according to the aforementioned method by pot broaching.

In pot broaching, the raw piece or the workpiece is drawn or pressed through a tubular broaching tool, wherein, as the relative movement progresses, the crown gearing is successively produced by the machining removal of material on the workpiece. In the meantime, the workpiece is enclosed all over by the tubular broaching tool, wherein the crown gearing is typically completely produced in one operation or in one broaching cycle. Typically, no re-working takes place. This process can also be referred to as outside pot broaching. The pot broaching or outside pot broaching takes place on a pot broaching machine, in particular on a vertical or horizontal pot broaching machine.

It is preferably provided that the broaching tool utilized for producing the crown gearing includes so-called broaches. The broaches are provided, inter alia, for chip removal. The broaches are designed in such a way, in particular, that the undercut-like transitions between the groove flanks and the groove bases can therefore be produced at the same time.

BRIEF DESCRIPTION OF THE DRAWINGS

The invention is explained in greater detail in the following with reference to the figures, by way of example and in a non-restrictive manner. The features shown in the figures and/or explained in the following can refine the invention, also independently of specific combinations of features.

DETAILED DESCRIPTION

Figure 1:
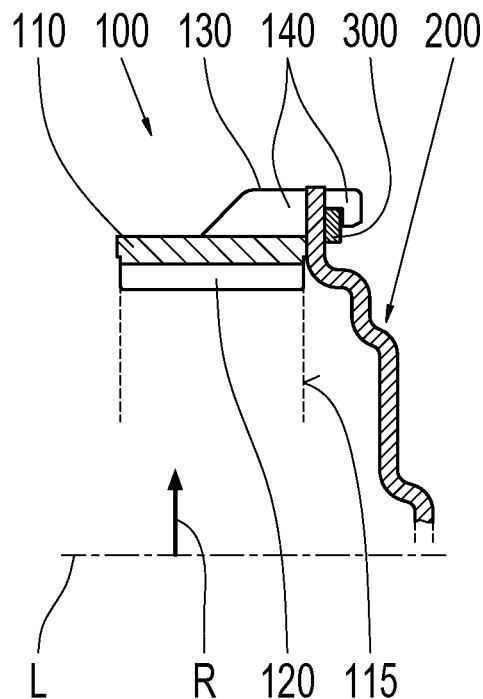
FIG. 1 shows a cutaway view of the gear ring of a planetary transmission ring gear according to the invention and a ring gear carrier attached thereto.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows the gear ring 110 of a ring gear 100, according to the invention, for a planetary transmission in a representation analogous to DE 199 61 988 A1. The circumferential edges are not represented, for the sake of improved clarity. The ring gear 100 has an axis of symmetry or rotation L, by which an axial direction and a radial direction R perpendicular thereto are defined. Attached to the gear ring 110 is a ring gear carrier 200 which simultaneously acts as a driving part for the rotationally fixed connection to a shaft or to another gear. The ring gear carrier can also be a fixing element which holds the ring gear 100 in place. The ring gear carrier 200 is a sheet-metal component manufactured by punching and shaping.

The gear ring 110 is formed, on its inner circumferential surface, with an internal gearing 120 which intermeshes with the planetary gears of the planetary transmission. In particular, the internal gearing is involute and/or helical gearing. The gear ring 110 includes a circumferentially formed flange 130 on its outer circumferential surface. The tenon-like flange 130 includes two flange sections 131 and 132 (see FIG. 2). The first flange section 131, which extends across only a portion of the width of the gear ring 110, results in a radial thickening of the gear ring 110 and thereby forms a circumferential collar. The second flange section 132, which axially projects beyond or overhangs the face end 115 of the gear ring 110 on the side of the ring gear carrier 200, forms a collar-like overhang, to which the ring gear carrier 200 is attached.

The circumferential flange 130 is formed with a crown or spline 140 over the entire circumference of the gear ring 110. The ring gear carrier 200 includes a corresponding mating gearing, with which the ring gear carrier is mounted on or inserted into the crown gearing 140, whereby a rotationally fixed connection exists. The axial locking takes place with the aid of a securing ring 300. Unlike the ring gears of the same type known from the prior art, the crown gearing 140 formed on the flange 130 is of continuous design and protrudes or extends through the flange 130 in the axial direction L. This yields several advantages, as explained above.

In the overhung second flange section 132 of the crown gearing 140, the tooth gaps 142 are continuous in the radial direction R. The tooth gaps 142 continue in the first collar-like flange section 131 as groove-like tooth gaps having the same gap width w, as is apparent from FIGS. 2 and 3. There, the tooth gaps 142 extending between adjacent teeth 141 include two tooth flanks or groove flanks 143 spaced from each other in the circumferential direction U and a groove base 144 curved in the circumferential direction U. The straight and mutually symmetrical groove flanks 143 can have an angle of inclination a between 0° and 25° with reference to the radial direction R of the gear ring 110. Axially extending, undercut-like transitions 145 are formed between the groove flanks 143 and the groove bases 144. The tooth gaps or grooves 142 extending through the flange 130 have a contour which is uniform in the axial direction L, i.e., does not change across its axial course. The groove bases 144 extend in the axial direction or in parallel to the axis of symmetry or rotation L, as is apparent from FIG. 2.

Figure 2:
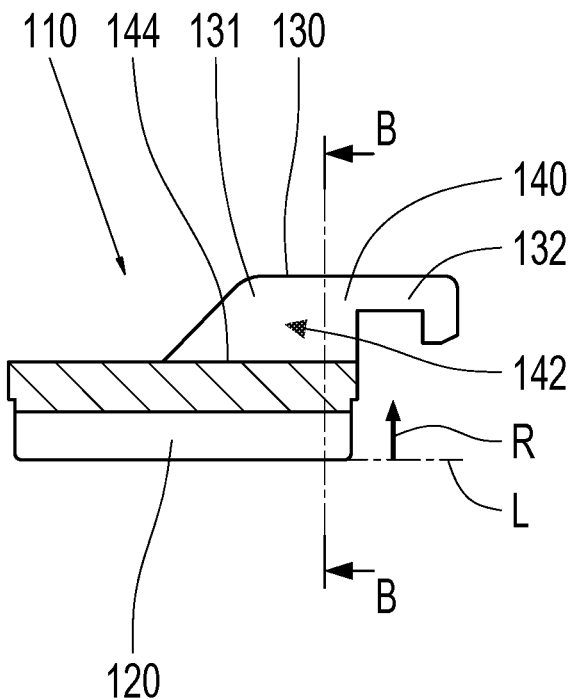
FIG. 2 shows an enlarged sectioning of the gear ring from FIG. 1.
Figure 3:
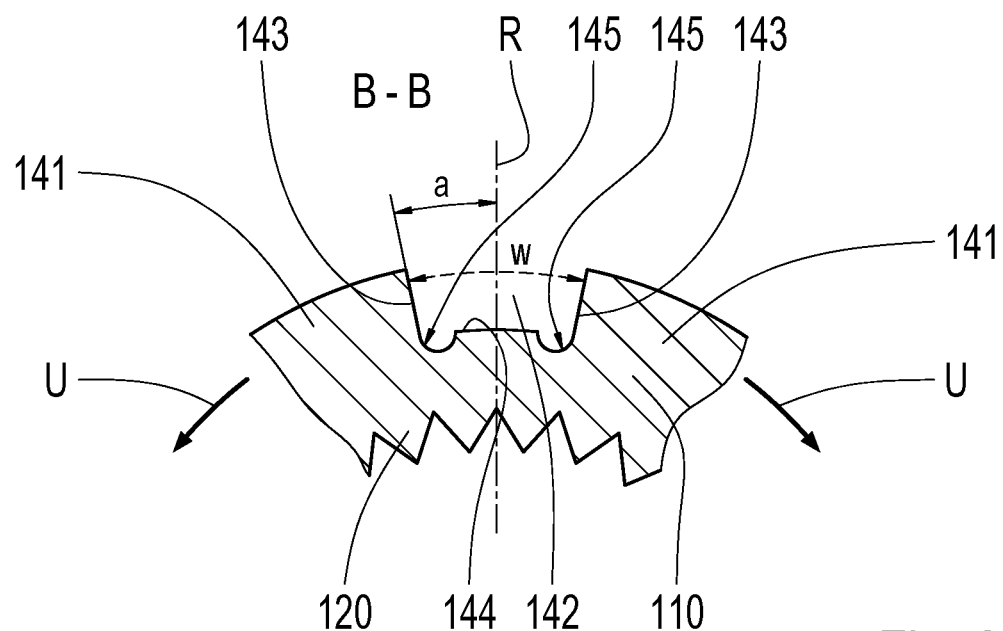
FIG. 3 shows the gear ring from FIG. 1 in another sectioning, according to the cutting line indicated in FIG. 2.
Figure 4:
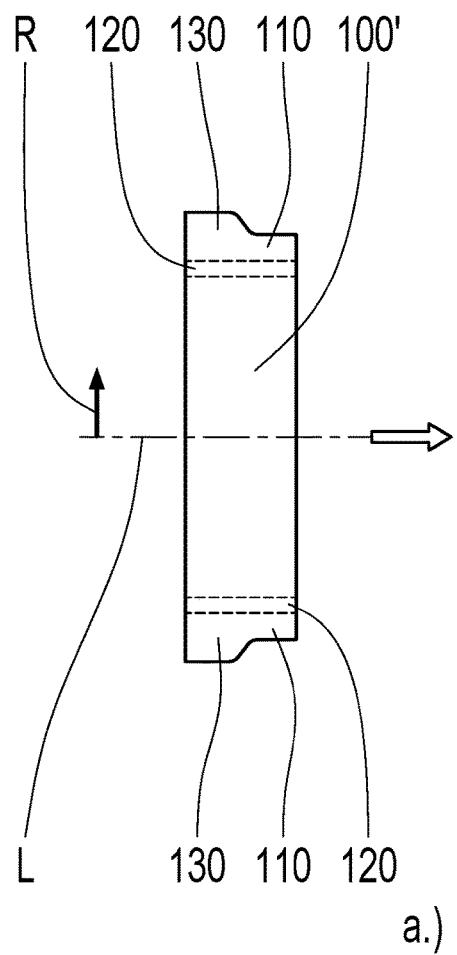
FIG. 4 illustrates the manufacture of the crown gearing on the gear ring from FIG. 1 by pot broaching.
Figure 4:
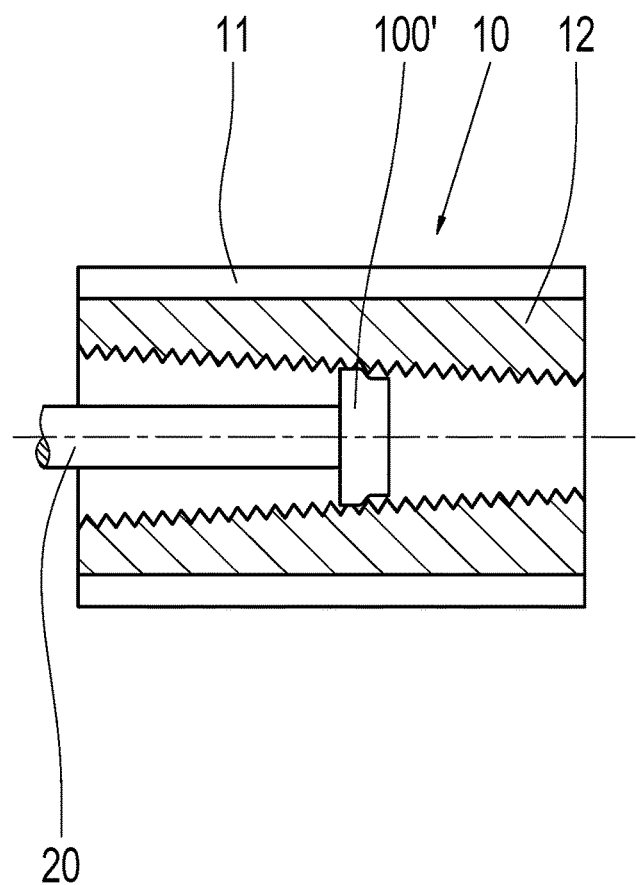

The manufacture of the crown gearing 140 is illustrated in FIG. 4. FIG. 4a shows a prefabricated ring gear 100' which is formed as a single piece from steel material and includes a flange 130 and an internal gearing 120. The ring gear 100', which is formed still without the crown gearing 140, is clamped onto a pressing rod 20 and is pressed through a tubular broaching tool 10 with the aid of this pressing rod 20, as shown in FIG. 4b (the pressing-through takes place from left to right according to the representation). The broaching tool 10 includes a tube 11 including interior tool inserts 12. By the tool inserts 12, a crown gearing 140 according to FIGS. 2 and 3 is produced on the flange 130 of the ring gear 100' by the machining removal of material. In this case, all teeth 141 and tooth gaps or grooves 142 of the crown gearing 140 are formed in one operation or in one broaching cycle. This process is referred to as pot broaching (the representation in FIG. 4b, which is not true to scale, is merely intended to explain the principle of pot broaching).

The crown gearing 140 produced using the procedure explained above is therefore an axially extending, pot-broached spline. The second axially overhung flange section 132 of the flange 130 can be produced, in particular by boring on the face end, before or also first after the pot broaching.

Modifications and variations can be made to the embodiments illustrated or described herein without departing from the scope and spirit of the invention as set forth in the appended claims.

REFERENCE CHARACTERS

| | |
|---|---|
| 10 | broaching tool |
| 11 | tube |
| 12 | tool insert |
| 20 | pressing rod |
| 100 | ring gear |
| 110 | gear ring |
| 115 | face end |
| 120 | internal gearing (running gearing) |
| 130 | flange |
| 131 | first flange section (collar) |
| 132 | second flange section (overhang) |
| 140 | crown gearing (spline) |
| 141 | tooth |
| 142 | tooth gap, groove |
| 143 | tooth flank, groove flank |
| 144 | groove base |
| 145 | transition |
| 200 | ring gear carrier |
| 300 | securing ring |
| L | axial direction (axis of symmetry) |
| R | radial direction |
| U | circumferential direction |
| a | angle |
| w | width |

The invention claimed is:

1. A ring gear (100) for a planetary transmission, comprising a gear ring (110) formed with an internal gearing (120) on an inner circumferential surface of the gear ring (110), the gear ring (110) comprising a radially projecting and unilaterally axially overhung flange (130) on an outer circumferential surface of the gear ring (110), the flange (130) formed with a circumferential collar (131) and a collar overhang (132), the collar overhang (132) having a crown gearing (140), wherein the crown gearing (140) is continuous and axially extends through the collar (131), wherein the circumferential collar (131) and the collar overhang (132) of the flange (130) are positioned radially outward of the outer circumferential surface of the gear ring (110), and wherein the collar overhang (132) of the flange (130) is cantilevered from the gear ring (110) such that the collar overhang (132) of the flange (130) is overhung above an end face (115) of the gear ring (110).

2. The ring gear (100) of claim 1, wherein tooth gaps (142) of the crown gearing (140) have a constant gap width (w) in the axial direction (L).

3. The ring gear (100) of claim 2, wherein the tooth gaps (142) of the crown gearing (140) are radially continuous in the collar overhang (132).

4. The ring gear (100) of claim 1, wherein tooth gaps (142) of the crown gearing (140) are grooved in the collar (131), and each of the tooth gaps (142) have a groove base (144) in the collar (131).

5. The ring gear (100) of claim 4, wherein the grooved tooth gaps (142) each have two circumferentially spaced groove flanks (143), and the groove base (144) is curved in a circumferential direction (U).

6. The ring gear (100) of claim 5, wherein the groove flanks (143) are straight and have an angle of inclination (a) between zero degrees and twenty-five degrees with reference to a radial direction (R) in each of the groove tooth gaps (142).

7. The ring gear (100) of claim 4, wherein the grooved tooth gaps (142) each have two circumferentially spaced groove flanks (143), and undercut transitions (145) are formed between the groove flanks (143) and the groove base (144) in each of the groove tooth gaps (142).

8. The ring gear (100) of claim 1, wherein the ring gear is formed from a single piece of metal.

9. A method for manufacturing the ring gear (100) of claim 1, comprising:
   acquiring an annular raw piece (100') formed with the flange (130);
   producing the internal gearing (120) by inside broaching; and
   producing the crown gearing (140) on the flange (130) by pot broaching.

10. An automatic transmission for a motor vehicle or a commercial vehicle, comprising at least one of the ring gear (100) of claim 1.

* * * * *